United States Patent
Munson et al.

(10) Patent No.: US 10,415,735 B2
(45) Date of Patent: Sep. 17, 2019

(54) LABYRINTH SEAL WITH TUNABLE FLOW SPLITTER

(71) Applicant: Rolls-Royce Corporation, Indianapolis, IN (US)

(72) Inventors: John Munson, Indianapolis, IN (US); Phillip H. Burnside, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 505 days.

(21) Appl. No.: 15/179,400

(22) Filed: Jun. 10, 2016

(65) Prior Publication Data

US 2016/0369925 A1 Dec. 22, 2016

Related U.S. Application Data

(60) Provisional application No. 62/180,676, filed on Jun. 17, 2015.

(51) Int. Cl.
| | |
|---|---|
| *F16L 41/02* | (2006.01) |
| *F01D 11/02* | (2006.01) |
| *F01D 11/04* | (2006.01) |
| *F16J 15/447* | (2006.01) |

(52) U.S. Cl.
CPC ............. *F16L 41/02* (2013.01); *F01D 11/02* (2013.01); *F01D 11/04* (2013.01); *F16J 15/4472* (2013.01)

(58) Field of Classification Search
CPC .......... F01D 11/02; F01D 11/04; F01D 11/08; F01D 11/12; F01D 11/14
USPC ...................................................... 415/173.5
See application file for complete search history.

(56) References Cited

U.S. PATENT DOCUMENTS

| | | | |
|---|---|---|---|
| 4,513,975 A | 4/1985 | Hauser et al. | |
| 5,218,816 A | 6/1993 | Plemmons et al. | |
| 5,244,216 A | 9/1993 | Rhode | |
| 5,281,090 A * | 1/1994 | Starling ................. | F01D 11/02 277/413 |

(Continued)

FOREIGN PATENT DOCUMENTS

| | | |
|---|---|---|
| DE | 102010006716 A1 | 8/2010 |
| FR | 1201361 A | 12/1959 |
| FR | 2353704 A1 | 12/1977 |

OTHER PUBLICATIONS

Extended European Search Report dated Dec. 1, 2016 for EP Pat App No. 16173644.2.
English Translation of Abstract for DE102010006716.

*Primary Examiner* — Timothy L Maust
(74) *Attorney, Agent, or Firm* — Fishman Stewart PLLC (57) ABSTRACT

A flow splitter includes a stepped ring and a flow restriction. The stepped ring includes a first inner wall having a first diameter, a second inner wall having a second diameter less than the first diameter, a radial step that transitions from the first to the second inner wall, and a plurality of apertures circumferentially located along the first inner wall and partially through the radial step. The first flow restriction has at least a portion thereof at a position between the first diameter and the second diameter. Further, the first flow restriction directs a flow of at least one of a gas and a fluid towards the first inner wall, and is configured to split the flow into an exit flow and a secondary flow. The exit flow exits the stepped ring via the plurality of apertures and the secondary flow proceeds downstream directed by the second inner walls.

14 Claims, 6 Drawing Sheets

(56) References Cited

U.S. PATENT DOCUMENTS

| | | | |
|---|---|---|---|
| 5,971,710 | A | 10/1999 | Stauffer et al. |
| 6,102,655 | A | 8/2000 | Kreitmeier |
| 6,652,226 | B2 | 11/2003 | Albrecht, Jr. et al. |
| 7,001,145 | B2 * | 2/2006 | Couture ................. F01D 5/225 415/173.4 |
| 7,025,565 | B2 | 4/2006 | Urso et al. |
| 7,210,900 | B2 | 5/2007 | Urso et al. |
| 7,971,882 | B1 | 7/2011 | Liang |
| 8,105,021 | B2 * | 1/2012 | Glahn .................. F01D 11/001 415/168.2 |
| 8,167,547 | B2 * | 5/2012 | Wu et al. ................ F01D 11/00 415/173.5 |
| 8,870,531 | B2 | 10/2014 | Blanchard et al. |
| 8,926,269 | B2 | 1/2015 | Dillard et al. |
| 2010/0008756 | A1 * | 1/2010 | Inomata ................. F01D 11/02 415/14 |
| 2010/0171268 | A1 * | 7/2010 | Kneeland ............... F01D 11/00 277/301 |
| 2013/0017072 | A1 | 1/2013 | Ali et al. |
| 2013/0084168 | A1 | 4/2013 | Babu et al. |
| 2013/0214492 | A1 * | 8/2013 | Nielsen ................. F01D 25/186 277/347 |
| 2013/0266427 | A1 | 10/2013 | Mahle et al. |
| 2015/0016985 | A1 | 1/2015 | Mahle et al. |
| 2015/0300189 | A1 * | 10/2015 | Janarthanan .......... F01D 11/001 277/347 |

\* cited by examiner

LABYRINTH SEAL WITH TUNABLE FLOW SPLITTER

CROSS-REFERENCE TO RELATED APPLICATIONS

This application is a non-provisional application claiming priority to U.S. Provisional Application No. 62/180,676 filed Jun. 17, 2015, which is hereby incorporated by reference in its entirety.

FIELD OF TECHNOLOGY

The present disclosure relates to flow splitters and more particularly, but not exclusively, to a flow splitter method, system, and/or apparatus that may be employed in a turbine engine. Further, this present disclosure relates to enhancement of engine seal systems. The improvements are applicable to a variety of engine types such as turbine engines. Although the improvements are applicable to turbine engines used for propulsive power in air, the improvements are also applicable to turbine engines employed in marine, underwater, and land applications.

BACKGROUND

Flow splitters are generally employed to split an incoming flow (e.g., a gas flow or liquid flow) into two or more flows. Aircraft and other machinery employ flow splitters to, for example, direct fluids to various components, create core flow and bypass flows, and/or simply direct cooling airflows. Seals are also employed to control air flow and liquid flow in static and moving parts within machinery. For example, turbine engine seals are located in numerous locations such as on rotors, turbines, and etc., so as to provide cavities for transitioning gases (e.g., air) and fluids to pass therethrough. A labyrinth seal is a type of seal often found in turbines and compressors thereof. These seals are often employed to control air or liquid leakage from high pressure regions to low pressure regions. For example, a labyrinth seal may be employed to seal two components together in such a manner to permit a controlled flow (e.g., airflow) from a high pressure region through a sealed boundary to a low pressure region. At times, it may be beneficial to redirect some of the flow between the high and low pressure regions. Accordingly, it may be beneficial to employ a flow splitter with, for example, a labyrinth seal to split incoming flow between high and low pressure regions to create two or more distinct flows. Such a task, however, can be problematic and, if not executed properly, can cause damage to downstream components and/or engine inefficiencies.

Accordingly there is room for improvement in this area.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

Figure 1A:
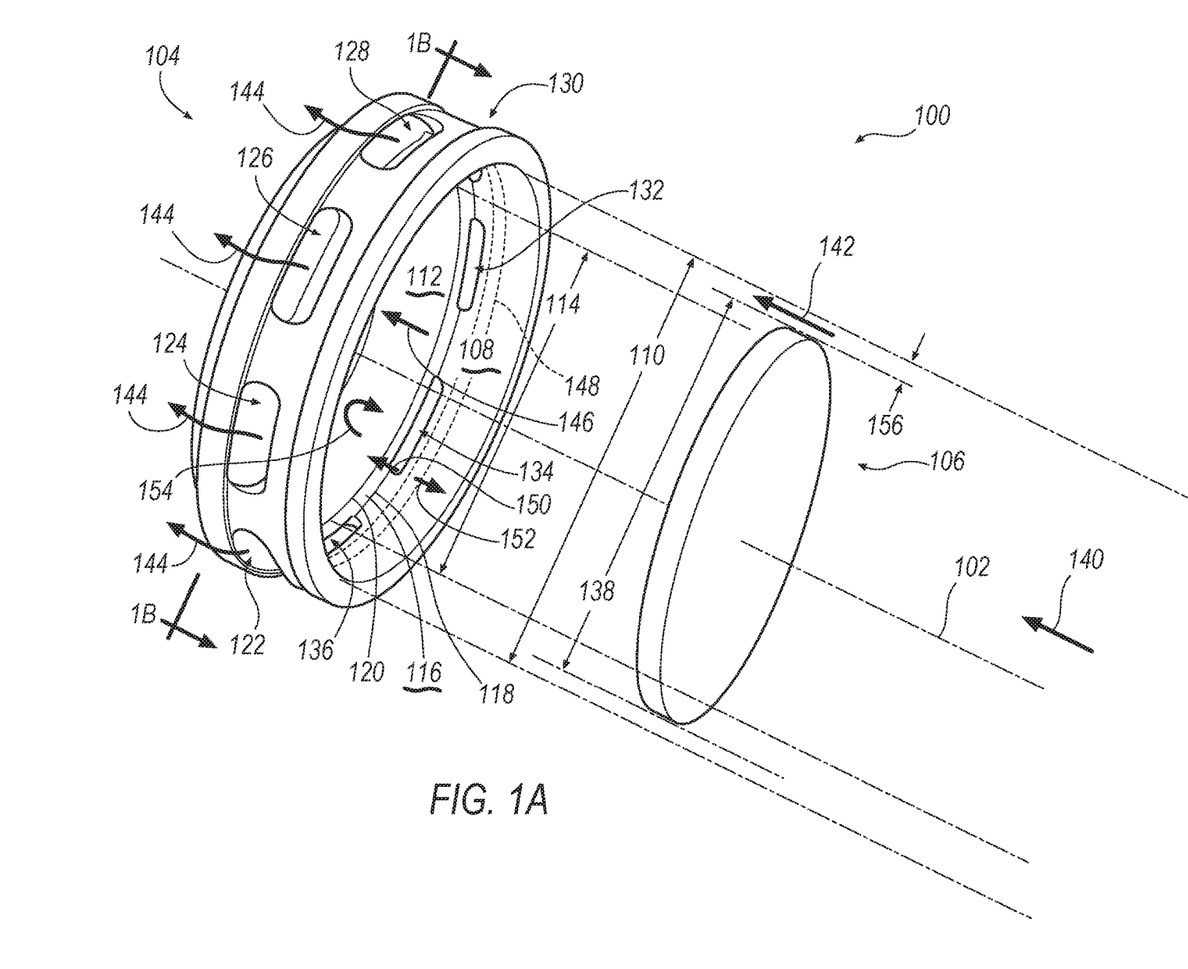
FIG. 1A illustrates an exploded view of an exemplary flow splitter according to an embodiment.

FIG. 1A illustrates an exploded view of an exemplary flow splitter 100 according to an embodiment. The flow splitter 100, depicted along a center-line axis 102, includes a stepped ring 104 and an upstream restriction 106. The stepped ring 104 includes a first inner wall 108 having a first inner diameter 110 and a second inner wall 112 having a second inner diameter 114 that is less than the first inner diameter 110.

A transition or radial step 116 transitions between the first and second inner walls 108, 112, respectively. A first end 118 of the radial step 116 is adjacent to (or transitions to) the first inner wall 108. A second end 120 of the radial step 116, which is opposite the first end 118, is adjacent to (or transitions to) the second inner wall 112. Though not shown, it will be appreciated that more than one radial step may be employed to transition between the first and second inner walls, 108, 112, respectively. Further, though the radial step 116 illustrated is substantially perpendicular to the first and second inner walls 108, 112, one or more steps (not shown) at an angle other than 90 degrees may instead be employed.

The stepped ring 104 of the flow splitter 100 also includes a plurality of apertures 122, 124, 126, 128, 130, 132, 134 136 circumferentially positioned around and through the first inner wall 108 and a portion of the radial step 116. Though the present embodiment illustrates eight apertures 122-136, other embodiments may employ more or less than eight apertures. It is noted that the apertures 122-136 pass through the stepped ring 104 by passing through both the first inner wall 108 and a portion of the step 116.

According to the illustrated embodiment, the upstream restriction 106 of the flow splitter 100 has a diameter 138 (a.k.a. a restriction diameter) that is greater than the second inner diameter 114 of the second inner wall 112, but less than the first inner diameter 110 of the first inner wall 108. As will be described below with respect to FIG. 1B, when the upstream restriction 106 is positioned within the stepped ring 104, the upstream restriction 106 diverts a flow 140 (e.g., a flow of gas or liquid) towards the first inner wall 108 to create a restricted flow 142. At least some of this flow is diverted into an exit flow 144 that passes through each of the plurality of apertures 122-136. Any remaining restricted flow 142 passes as a secondary flow 146 that is directed by the second inner wall 112.

The volume or rate of exit flow 144 that exits the stepped ring 104 can be manipulated or tuned by varying the quantity and/or circumferential extent of the apertures (e.g., apertures 122-136). For example, if the circumferential extent of one or more of the apertures 122-136 were increased, the rate or volume of the exit flow 144 would also increase, and accordingly the rate or volume of the secondary flow 146 would decrease. Conversely, if the circumferential extent of one or more of the apertures 122-136 were decreased, the rate of the exit flow 144 would decrease, and accordingly the rate of the secondary flow 146 would increase. Alternatively, the quantity of apertures could be increased to increase the rate of exit flow 144 or decreased to decrease the rate of exit flow 144.

It is noted that the quantity and/or sum circumference of the apertures may be increased to the point where the secondary flow 146 reduces to substantially zero. If increased even further, the secondary flow 146 may be caused to reverse direction and aspirate out the apertures (e.g., apertures 122-136).

If adjustable aperture size is desired, it is contemplated that the flow splitter 100 may include an aperture adjustment structure such as ring 148 (a.k.a. an exemplary adjustable flow control structure), as shown in phantom. The aperture adjustment ring 148 is configured to modify the rate of the exit flow 144. According to an embodiment, the aperture adjustment ring 148 may be caused to move in a first direction 150 to at least partially cover one or more of the apertures 122-136 and therefore decrease the effective size of the one or more apertures 122-136. It will be appreciated that decreasing the effective size of the one or more apertures 122-136 will decrease the rate of the exit flow 144 while also causing the secondary flow 146 rate to increase. At a later time, the aperture adjustment ring 148 may be moved in a second direction 152 to increase the effective aperture sizes back to the original state. It is noted that the circumferential extent of the apertures 122-136 could be of such a magnitude that moving the aperture adjustment ring 148 through the second direction 152 causes an aspirated flow 154 within the second inner wall 112 (i.e., creates a negative pressure to cause the secondary flow 146 to reverse direction).

It will be appreciated that an aperture adjustment ring (e.g., aperture adjustment ring 148) could be placed in locations (e.g., outside or within the first inner wall 108) other than that shown. Further, it will also be appreciated that other types of aperture adjustment structures may be employed to the same or similar effect.

Figure 1B:
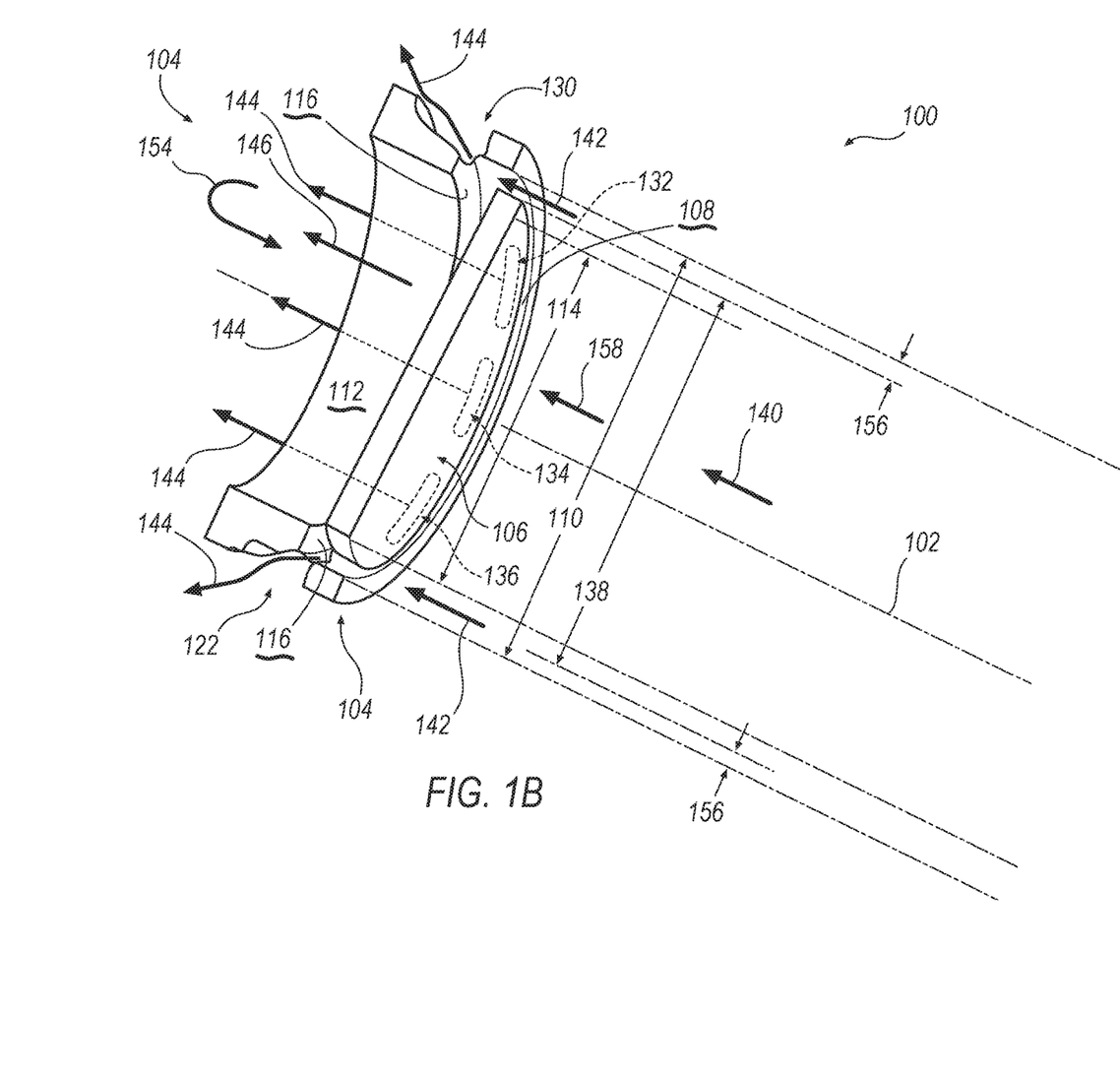
FIG. 1B illustrates a cross-sectional view of the flow splitter of FIG. 1A along 1B-1B according to an embodiment.

Referring now to FIG. 1B, a cross-sectional view of the flow splitter 100 along 1B-1B of FIG. 1A is illustrated, with the upstream restriction 106 placed within the stepped ring 104. As set forth above with respect to FIG. 1A, the restriction diameter 138 (FIG. 1B) of the upstream restriction 106 is greater than the second inner diameter 114 but less than the first inner diameter 110. As such, there is a gap 156 between the first inner wall 108 and the upstream restriction 106. When in operation, the upstream flow 140 comes into contact with the upstream restriction 106 and creates an obstructed flow 158. Due to the gap 156, a portion of the obstructed flow 158 passes through the gap 156 as a restricted flow 142. At least some of the restricted flow 142 is concentrated along the first inner wall 108 and is conveyed out of the stepped ring 104 via the apertures 122-126 (see FIGS. 1A and 1B) as exit flow 144. The remainder of the flow (i.e., the secondary flow 146) is conveyed downstream through the second inner wall 112.

With reference to both FIGS. 1A and 1B, by varying the quantity and/or size of the apertures (e.g., apertures 122-136), the rate of exit flow 144 that passes out through the apertures 122-136 can be adjusted or tuned. For example, if the circumferential extent of the apertures 122-136 were increased, the rate of the exit flow 144 would also increase. Similarly, if the circumferential extent of the apertures 122-136 were decreased, the rate of exit flow 144 leaving the stepped ring 104 via the apertures 122-136 would also decrease. If desired, the quantity and/or sum circumferential size of the apertures could be increased to decrease the rate of secondary flow 146 to substantially zero. If increased further, an effective negative pressure can be created within the second inner wall 112, causing the secondary flow to reverse direction (see reversed flow 154) and aspirate out of the stepped ring 104 via the apertures 122-136.

Figure 2A:
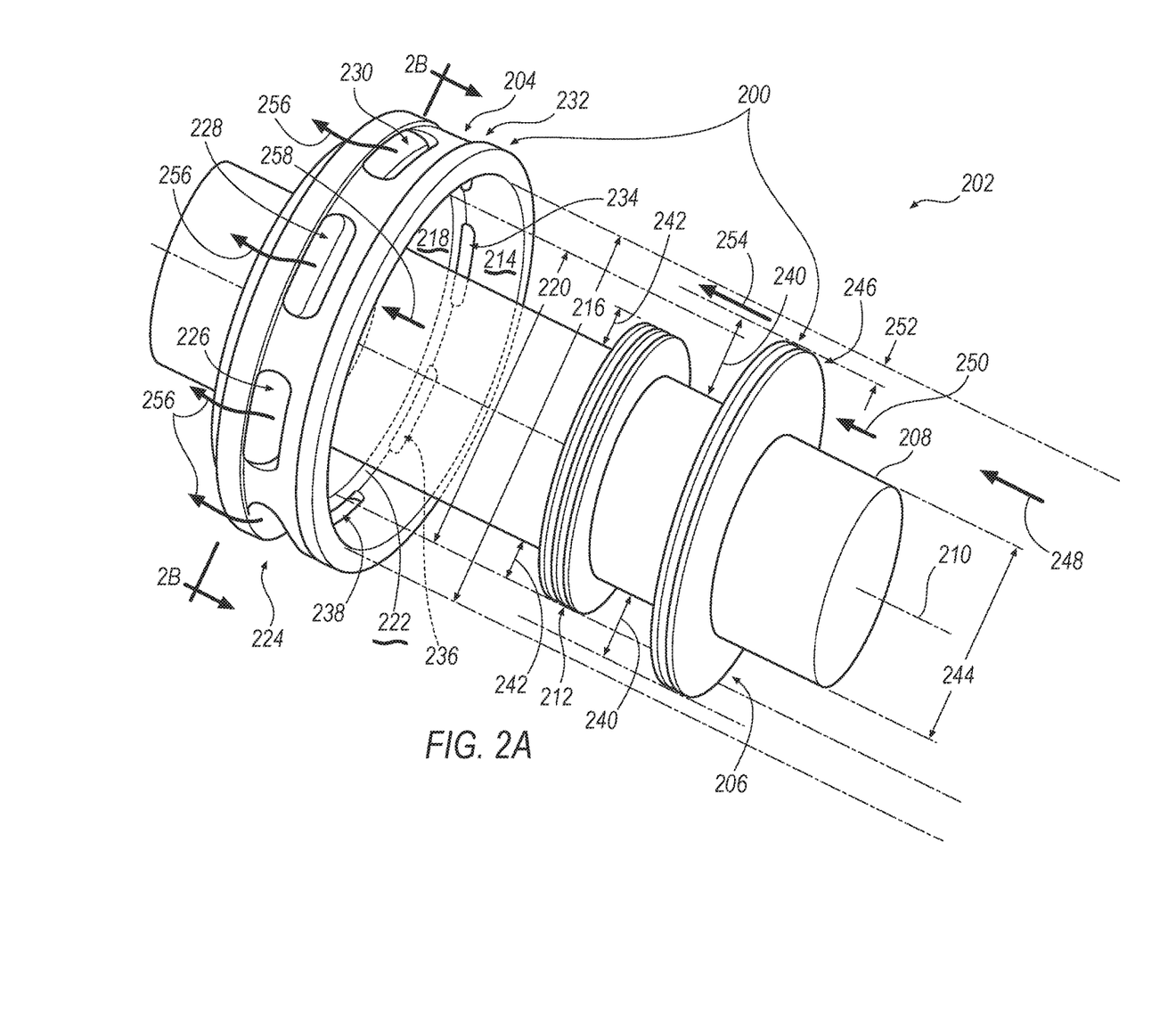
FIG. 2A illustrates an exploded view of an exemplary labyrinth seal employing a flow splitter according to an embodiment.

The flow splitters described herein may be employed in a variety of environments where the splitting of a gas (e.g., air) or liquid flow is desired. For example, FIG. 2A illustrates an exploded view of an exemplary flow splitter 200 in a labyrinth seal system 202. Labyrinth seal systems such as labyrinth seal system 202 may, for example, be part of a turbine engine environment.

The flow splitter 200 includes a stepped ring 204 (a.k.a. stator) along with an upstream restriction 206 (a.k.a. a first set of labyrinth knives) that is positioned on a rotor 208. As illustrated, the flow splitter 200 is shown along a center-line axis 210. According to the present embodiment, a downstream restriction 212 (a.k.a. a second set of labyrinth knives) is also employed. Though the present embodiment depicts two knives in the first set of labyrinth knives 206 and three knives in the second set of labyrinth knives 212, embodiments are envisioned where the quantity of labyrinth seal knives employed in either or both sets 206, 212 differ than those illustrated.

The stator 204 includes a first inner wall 214 having a first inner diameter 216 and a second inner wall 218 having a second inner diameter 220, which is less than the first inner diameter 216. As will be appreciated, the first and/or second walls 214, 218 may include an abradable material to protect the labyrinths knives 206 and/or 212 during operation.

With continued reference to FIG. 2A, a transition or radial step 222 serves as a flow blocker and a transition between the first and second inner walls 214, 218, respectively. Positioned along the circumference of the first inner wall 214 is a plurality of holes or apertures 224, 226, 228, 230, 232, 234, 236, 238 that pass through the first inner wall 214 and a portion of the radial step 222 before exiting the stator 204. Though the present embodiment depicts the apertures 224-238 as slots with the slot widths being greater than the slot heights, spherical-like holes or other geometries may be employed.

The first set of labyrinth knives 206 is at a first height 240 and the second set of labyrinth knives 212 is at a second height 242, while the rotor 208 has a rotor diameter 244. The height 240 of the first set of labyrinth knives 206 is selected such that the at least a portion 246 of the labyrinth knives 206 is positioned between the first inner diameter 216 and the second inner diameter 220 of the stator 204. Effectively, the sum of the rotor diameter 244 and twice the first height 240 creates an upstream restriction diameter (see e.g., restriction diameter 138 of FIG. 1A).

Figure 2B:
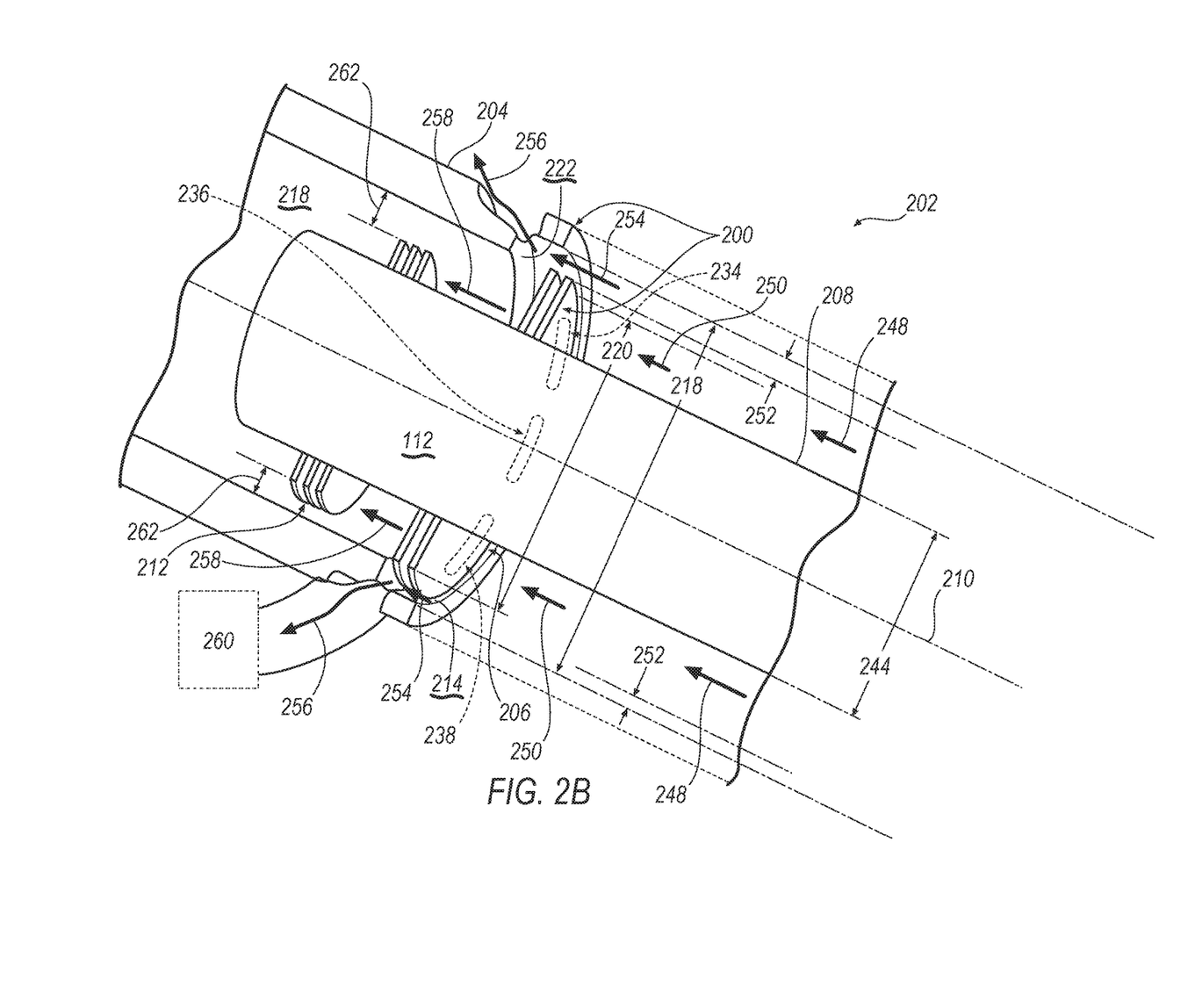
FIG. 2B illustrates a cross-sectional view of the labyrinth seal of FIG. 2A along 2B-2B according to an embodiment.

The height 242 of the second set of labyrinth knives 212, as illustrated in 2B, is selected such that no portion of the second set of labyrinth knives 212 extends to or past the second inner diameter 220 when mounted to the rotor 208 and positioned within the stator 204.

It is noted that according to an alternate embodiment, the first set of labyrinth knives 206 may be allowed to pass through grooves (not shown) in or on the first inner wall 214. Similarly, according to an alternative embodiment, the second set of labyrinth knives 212 may be allowed to pass through grooves (not shown) in or on the second inner wall 218.

With reference now to FIG. 2B, a cross-sectional view along 2B-2B of FIG. 2A is shown. Unlike FIG. 2A, however, FIG. 2B illustrates the rotor 208 and labyrinth knives 206, 212 positioned within the stator 204.

When the rotor 208 is positioned within the stator 204 and put into operation, as shown in FIG. 2B, airflow 248 that passes along the rotor 208 is obstructed by the first set of labyrinth knives 206 creating an obstructed flow 250. However, due to a gap 252 between the first set of labyrinth knives 206 and the first inner wall 214, a leakage flow 254 will pass downstream from the first set of labyrinth knives 206. At least some of the leakage flow 254 is concentrated along the first inner wall 214 and will be conveyed out of the stator 204 via the plurality of apertures 224-238 as exit flow 256. It is noted that the more closely aligned the passage of each aperture 224-238 is with the leakage flow 254, the greater the rate of exit flow 256 leaving via the apertures 224-238 will be. Any remaining flow that does not leave as exit flow 256 will pass downstream within the second inner wall 218 as a secondary flow 258. In other words, the labyrinth seal system (i.e., the stator 204 along with the first set of labyrinth knives 206 coupled to the rotor 208) is configured to split the air leakage flow 256 from the first set of labyrinth knives 206 into the exit flow 256 that passes out of the stator 204 via the apertures 224-238 and into the secondary flow 258 that passes over the second inner wall 218.

It is contemplated that the exit flow 256 may be simply exhausted or employed to work somewhere else. For example, as shown in phantom, at least a portion of the exit flow 256 may be employed to prime (i.e., pressurize) another labyrinth seal or other component 260 (represented as a simple block).

With regard to the second set of labyrinth knives 212, there is a gap 262 between the second set of labyrinth knives 212 and the second inner wall 218. In addition to manipulating the exit flow 256 by manipulating the apertures 224-238 (e.g., quantity and/or sum circumferential size), varying the first knife gap 262 and/or the second knife gap 252 can also effect the volume of exit flow 256, and therefore secondary flow 258.

If the embodiment depicted in FIG. 2B is employed in a gas turbine setting, it is beneficial that the gap 262 of the downstream flow restriction (i.e., second set of labyrinth knives 212) does not have a direct line of sight with the concentrated leakage flow (i.e., leakage flow 254).

Figure 3:
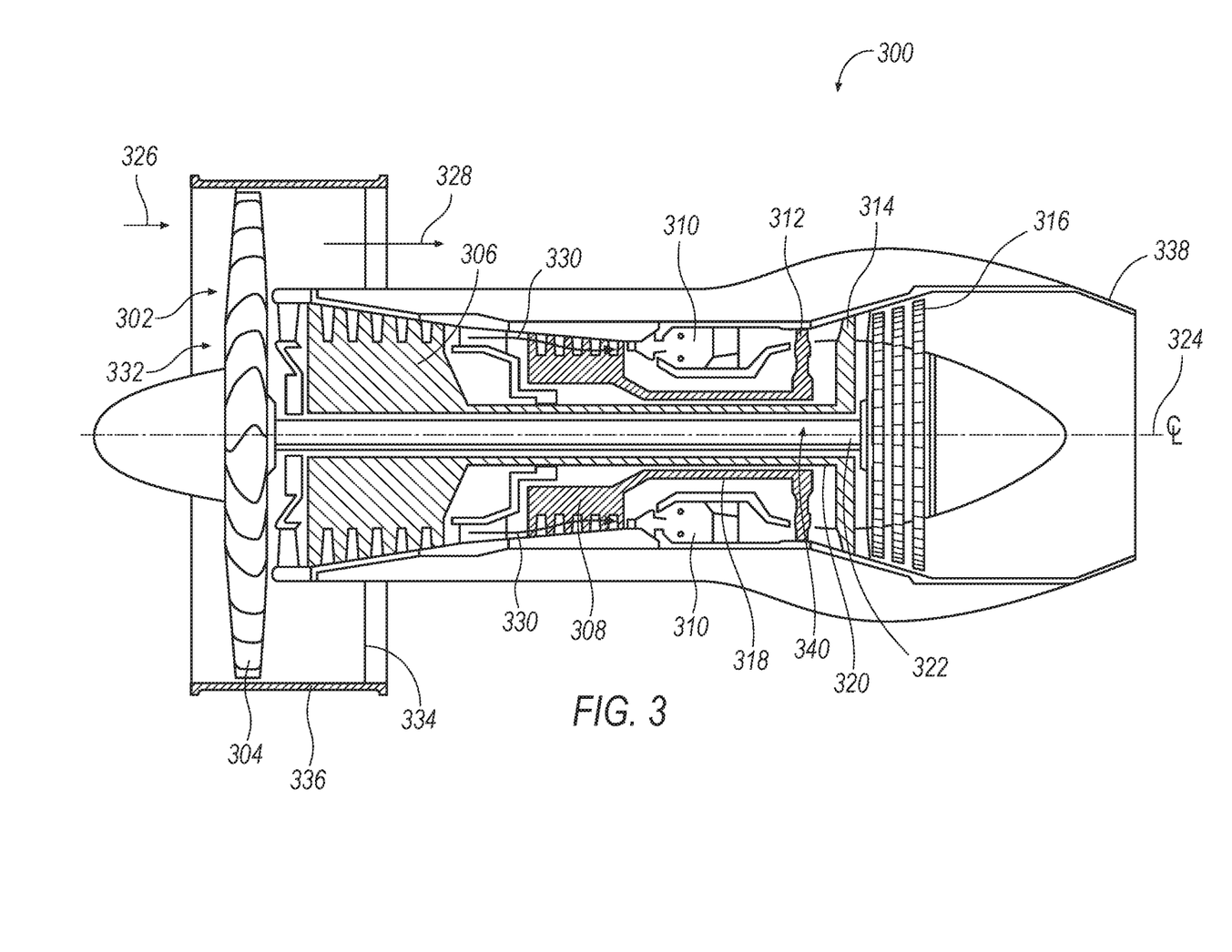
FIG. 3 illustrates an exemplary turbine engine according to an embodiment.

Referring now to FIG. 3 an exemplary turbine engine 300 that may employ one or more flow splitters (e.g., flow splitter 100 of FIGS. 1A and 1B and flow splitter 200 of FIGS. 2A and 2B) described herein is illustrated. The turbine engine 300 includes a fan 302, a low pressure compressor 304 ("LP compressor"), an intermediate pressure compressor 306 ("IP compressor"), a high pressure compressor 308 ("HP compressor"), a combustor 310, a high pressure turbine 312 ("HP turbine"), an intermediate pressure turbine 314 ("IP turbine") and a low pressure turbine 316 ("LP turbine"). The HP compressor 308, the IP compressor 306 and the LP compressor 304 are connected to a respective one of an HP shaft 318, an IP shaft 320 and an LP shaft 322, which in turn are connected to a respective one of the HP turbine 312, the IP turbine 314 and the LP turbine 316. The shafts extend axially and are parallel to a longitudinal center-line axis 324. While FIG. 3 illustrates a three-shaft engine, it will be appreciated that other embodiments can have configurations including more or less than three shafts.

During general operation of the engine 300, ambient air 326 enters the fan 302 and proceeds as a bypass airflow 328 and a primary air stream 330. The primary air stream 330 is created as the ambient air 326 is directed across a fan rotor 332 into an annular duct 334 (in part circumscribed by a fan case 336) and into the combustor 310. The bypass airflow 328 provides a fraction of engine thrust while the primary air stream 330 is directed to the combustor 310 (i.e., turbine combustion zone). The primary air stream 330 mixes with fuel in combustor 310 where ignition occurs. As a result of the ignition, expanding gas passes over the turbines 312, 314, 316 and is exhausted through a nozzle 338 generating thrust.

As will be appreciated, turbine engines such as turbine engine 300 often employ a variety of flow splitters and/or labyrinth seals. It is contemplated that variations of the flow splitters and labyrinth seals (e.g., flow splitters 100, 200 of FIGS. 1A-1B, 2A-2B, respectively, and labyrinth seal system 202 of FIGS. 2A-2B) described herein may be employed in a turbine engine such as exemplary turbine engine 300 of FIG. 3. For example, flow splitter and/or labyrinth seal embodiments or variations thereof may be employed in a region 340 next to HP turbine 312 near HP shaft 318 when it is desired to split an airflow. It will be appreciated that flow splitters or labyrinth seal systems employing a flow splitter described herein may also be coupled to other shafts such as IP shaft 320 and LP shaft 322, or other regions of the turbine engine 300 to control airflow(s).

It is noted that other machinery besides turbine engine 300 may benefit from the flow splitters and labyrinth seals described herein.

Figure 4:
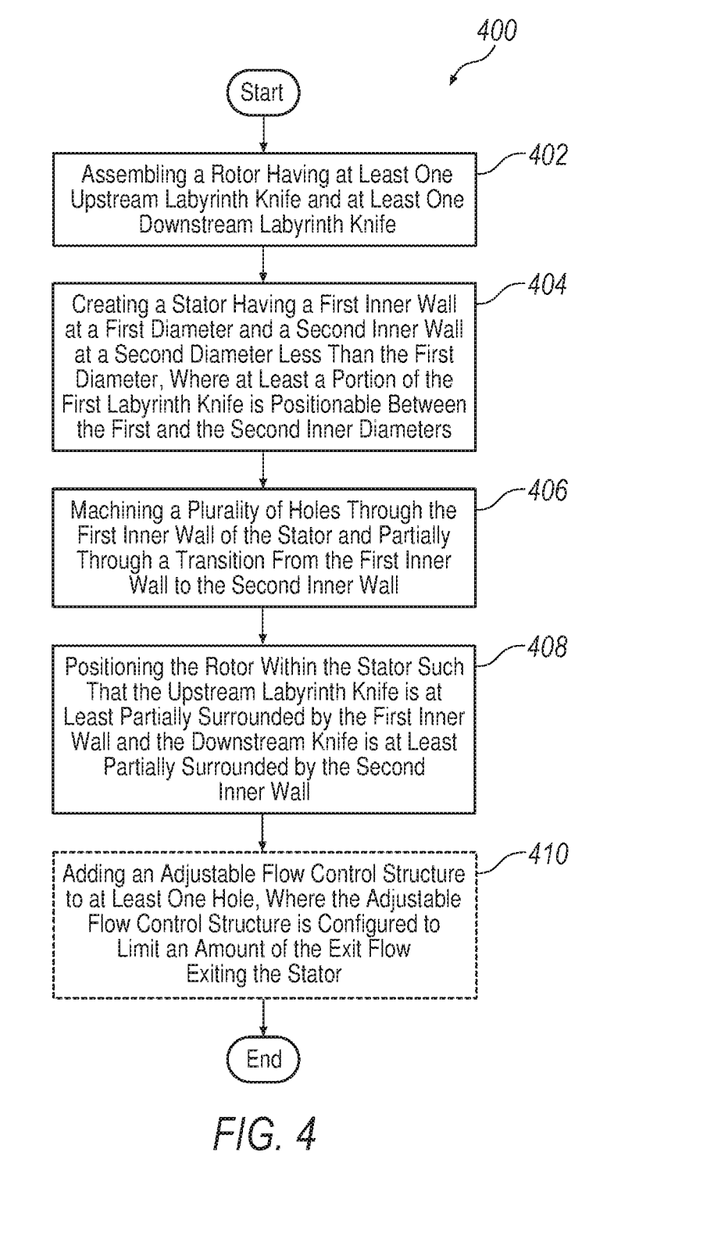
FIG. 4 is a flowchart representing an exemplary technique for manufacturing a labyrinth seal with a flow splitter according to an embodiment.

With reference now to FIG. 4, a flowchart depicts a technique 400 or method for manufacturing a labyrinth seal according to an embodiment. Technique 400 begins at block 402 with assembling a rotor having at least one upstream labyrinth knife and at least one downstream labyrinth knife protruding from the rotor. It is contemplated that the labyrinth knives may be coupled to the rotor in such a manner that allows for replacement if desired. That is, one or more of the labyrinth knives may be removable.

After assembling the rotor, process control proceeds to block 404, where creating a stator having a first inner wall at a first diameter and a second inner wall at a second diameter less than the first diameter occurs. The stator is configured such that at least a portion of the first labyrinth knife is positionable between the first and the second inner diameters. It is contemplated that the stator may be created from multiple modular components or simply machine, cast, and/or etc. as a single unit. If desired, abradable material may be added to the first and/or inner wall to protect the labyrinths knives during a transient operation.

Upon creating the stator, machining of a plurality of holes through the first inner wall of the stator and partially though a transition from the first inner wall to the second inner wall occurs at block 406. The apertures or hole pass through the stator and may take on a variety of forms. For example, one or more holes may be machined as slots such that the circumferential dimensions of the one or more holes has a width different than its height. Alternatively, the holes may be machined to have a spherical opening or other geometry.

It is noted that the assembling at block 402, the creating at block 404, and the machining at block 406 need not occur in the order set forth. Rather, according to alternate embodiments, the actions or processes set forth in blocks 402-406 may occur in any order or one more processes may occur simultaneously.

Referencing back to the sequence set forth in FIG. 4, after machining the apertures or holes through the stator, process control proceeds to block 408 and positioning the rotor within the stator occurs such that the at least one upstream labyrinth knife is at least partially surrounded by the first inner wall and the at least one downstream knife is at least partially surround by the second inner wall. When in operation, the labyrinth seal with its flow splitter (i.e., stator and at least one upstream knife) is configured to split an upstream flow into an exit flow and a secondary flow. The exit flow exits the stator via the plurality of holes and the secondary flow passes downstream within the second inner wall.

It is contemplated, as shown at block 410, that technique 400 may include adding an adjustable flow control structure to at least one hole of the plurality of holes. The flow control structure is configured to manipulate or tune the effective size of the apertures and, as such, control the rate of exit flow through the apertures. In turn, the rate of secondary flow past the second inner wall is also controlled. According to some embodiments, the flow control structure may be able to manipulate the rate of exit flow to such an extent that the secondary flow within the second inner wall reverses direction.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the to the contrary. Likewise, the use of the words "first", "second", and etc. may be interchangeable and need not necessarily indicate a sequence or a quantitative limit.

What is claimed is:

1. A labyrinth seal system comprising:
   a rotor comprising a first labyrinth knife set and a second labyrinth knife set, and
   a stator comprising:
   a first inner wall having a first inner diameter;
   a second inner wall having a second inner diameter less than the first inner diameter, wherein at least a portion of the first labyrinth knife set is positioned between the first and the second inner diameters;
   a step having a first end and a second end opposite the first end, wherein the first end of the step transitions to the first inner wall and the second end of the step transitions to the second inner wall; and
   a plurality of apertures that passes partially through the step, through the first inner wall, and in an axial direction along at least a portion of an exterior surface of the second inner wall, wherein each aperture of the plurality of apertures is configured to allow at least one of a liquid and a gas from within the stator to flow through the stator, and wherein the rotor is positionable in the stator such that first labyrinth knife set is positioned within the first inner wall and the second labyrinth set is positioned within the second inner wall.

2. The labyrinth seal system of claim 1, wherein the labyrinth seal is configured to split a flow of air leakage from the first labyrinth knife set into an exit flow that passes out of the stator via the plurality of apertures and into a secondary flow that passes over the second inner wall.

3. The labyrinth seal system of claim 1, wherein the labyrinth seal system is configured to pressurize a second labyrinth seal via at least one aperture of the plurality of apertures.

4. The labyrinth seal system of claim 3, wherein at least one aperture of the plurality of apertures is adjustable to modify a rate of the exit flow.

5. The labyrinth seal system of claim 1, wherein at least one aperture of the plurality of apertures is adjustable to create a negative pressure within the second inner wall to cause the secondary flow within the second inner wall to reverse direction.

6. The labyrinth seal system of claim 1, wherein the aperture is configured to form an upstream restriction by a slot having an aperture width greater than an aperture height.

7. The labyrinth seal system of claim 1, wherein the labyrinth seal system is configured for a turbine engine.

8. The labyrinth seal of claim 7, wherein the first and second labyrinth knife sets are removable from the rotor.

9. The labyrinth seal system of claim 8, wherein the first labyrinth knife set includes at least two labyrinth knives and the second labyrinth knife set includes at least three labyrinth knives.

10. A method of manufacturing a labyrinth seal comprising:
    assembling a rotor having at least one upstream labyrinth knife and at least one downstream labyrinth knife protruding from the rotor;
    creating a stator having a first inner wall at a first diameter and a second inner wall at a second diameter less than the first diameter, wherein at least a portion of the first labyrinth knife is positionable between the first and the second inner diameters;
    providing a plurality of holes through the first inner wall of the stator, partially though a transition from the first inner wall to the second inner wall, and in an axial direction along at least a portion of an exterior surface of the second inner wall, wherein the plurality of holes pass through the stator; and
    positioning the rotor within the stator such that the at least one upstream labyrinth knife is at least partially surrounded by the first inner wall and the at least one downstream knife is at least partially surrounded by the second inner wall.

11. The method of claim 10, wherein the labyrinth seal is configured to split an upstream flow into an exit flow and a secondary flow, and wherein the exit flow exits the stator via the plurality of holes and the secondary flow passes downstream within the second inner wall.

12. The method of claim 11, further comprising adding an adjustable flow control structure to at least one hole of the plurality of holes, wherein the flow control structure is configured to modify a rate of the exit flow exiting the stator such that a rate of the secondary flow is also modified.

13. The method of claim 11, wherein at least one hole of the plurality of holes is configured to form an upstream restriction by inner dimensions at a first height and a first width greater than the first height.

14. The method of claim 11, wherein the at least one upstream labyrinth knife is configured to direct the exit flow portion of the upstream flow towards the first inner wall.

* * * * *